Figure 1:
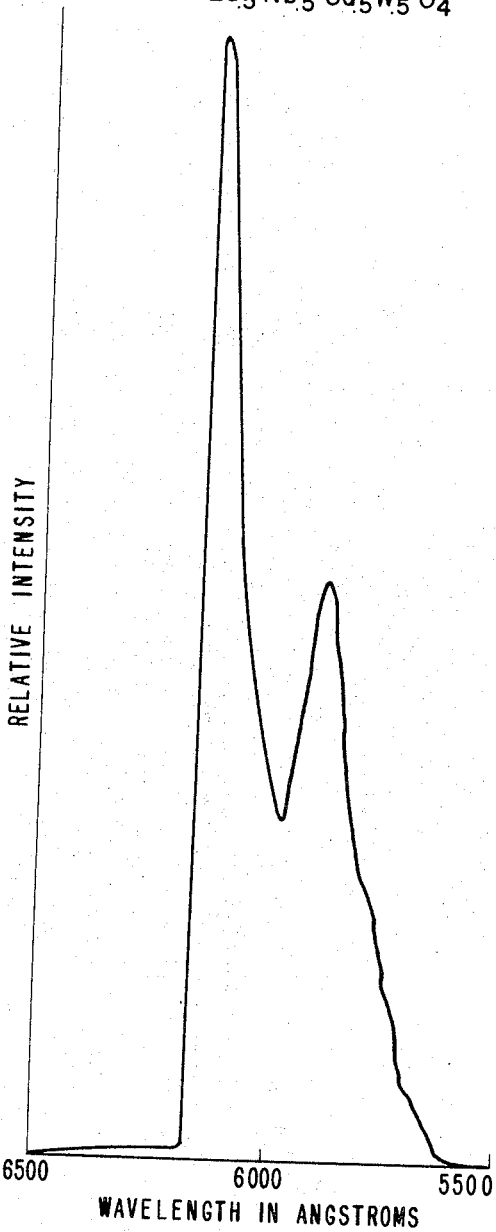

Aug. 29, 1967  L. H. BRIXNER  3,338,841
LUMINESCENT MOLYBDATE AND TUNGSTATE COMPOSITIONS
Filed May 14, 1964  4 Sheets-Sheet 1

FLUORESCENT EMISSION SPECTRUM OF
$Eu_{.5}Nb_{.5}Ca_{.5}W_{.5}O_4$

FLUORESCENT EMISSION SPECTRUM OF
$Dy_{.05}Nb_{.05}Ba_{.95}W_{.95}O_4$

INVENTOR
LOTHAR H. BRIXNER

Fred C. Carlson
ATTORNEY

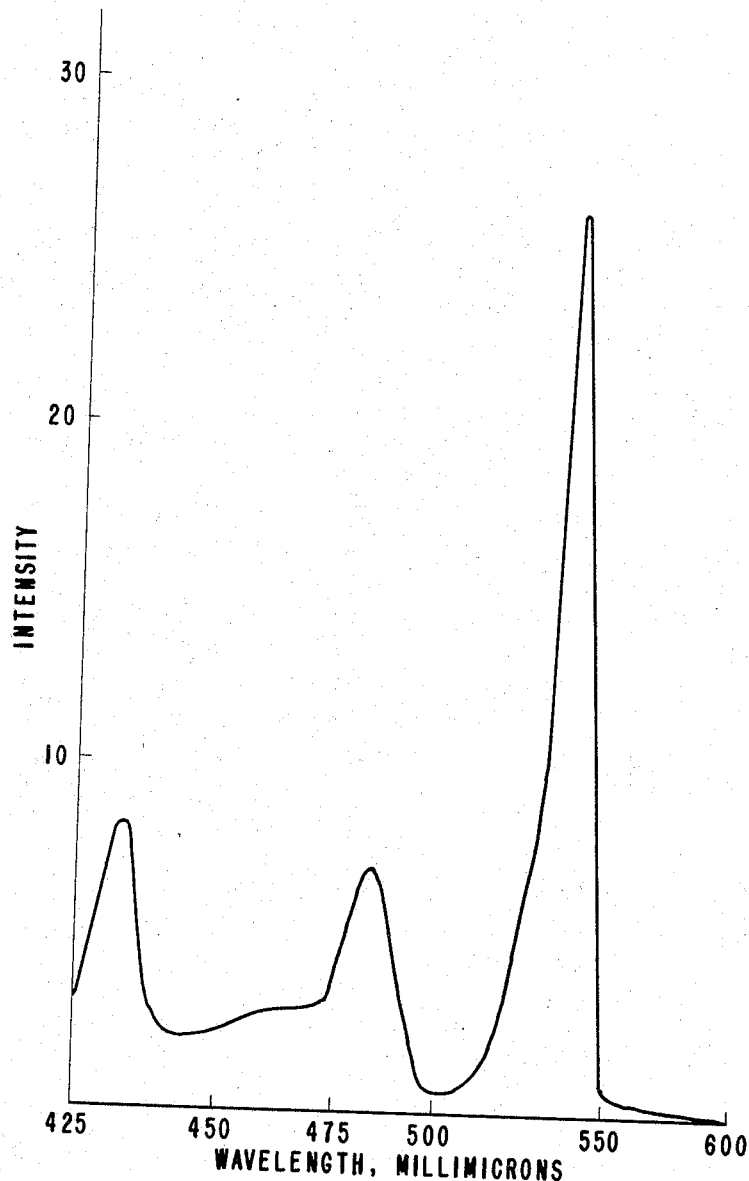

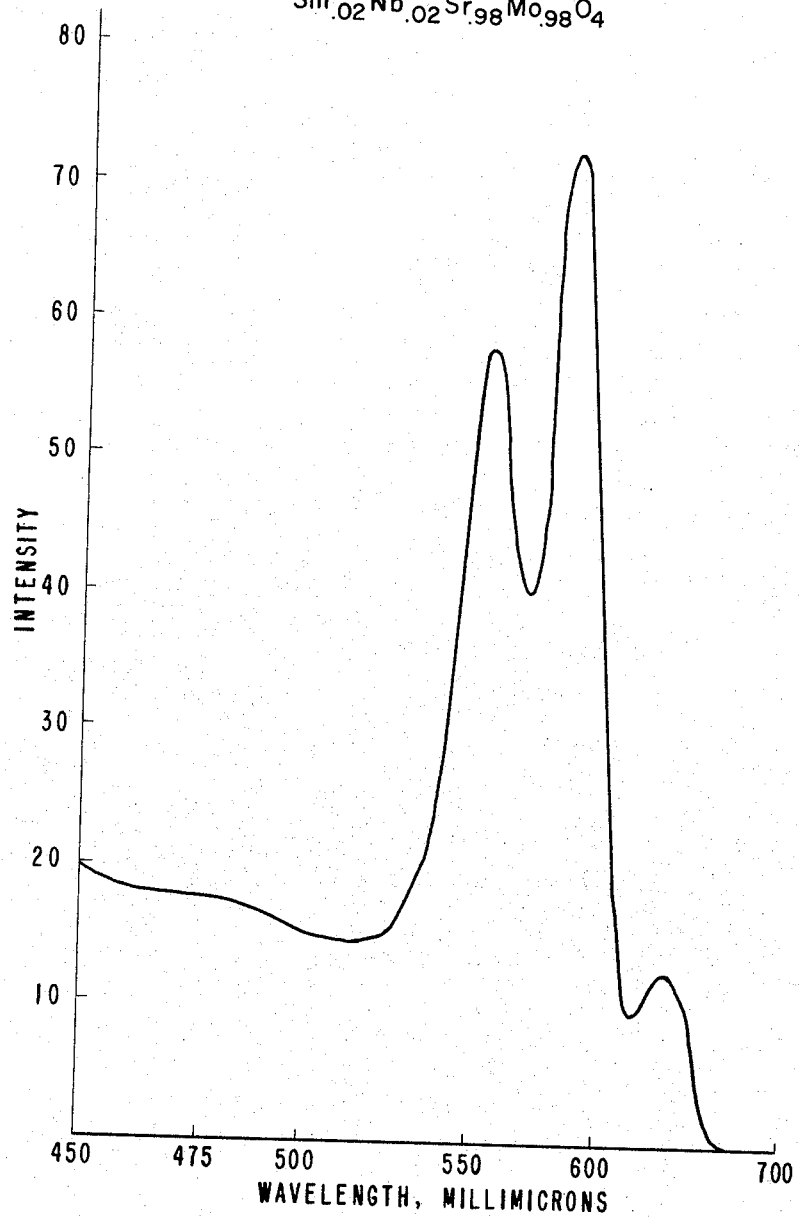

FLUORESCENT EMISSION SPECTRUM AT 77° K OF $(NdNb)_{0.01}(CaMo)_{0.99}O_4$

United States Patent Office 3,338,841
Patented Aug. 29, 1967

3,338,841
LUMINESCENT MOLYBDATE AND
TUNGSTATE COMPOSITIONS
Lothar H. Brixner, Brandywine Hills, Pa., assignor to
E. I. du Pont de Nemours and Company, Wilmington,
Del., a corporation of Delaware
Filed May 14, 1964, Ser. No. 367,518
5 Claims. (Cl. 252—301.4)

This application is a continuation-in-part of application Ser. No. 286,731, filed June 10, 1963, now abandoned.

This invention relates to new luminescent materials and methods for producing them, and is more particularly directed to novel compositions of matter which are single-phase solid solutions comprising varying proportions of the constituent component oxides $XNbO_4$, $XTaO_4$, $MWO_4$, and $MMoO_4$, in which X is a trivalent metal selected from the group consisting of rare earth metals of atomic numbers 58 through 60 and 62 through 71, yttrium and scandium, and M is an alkaline earth metal having an atomic number in the range from 20 to 56, inclusive. The invention is further particularly directed to processes for making these compositions by controlled heating of mixtures of oxides of the component metals. More specifically, the novel compositions are single-phase solid solution compounds of the generic formula:

$$A_xB_xC_{1-x}D_{1-x}O_4$$

where A is a trivalent metal selected from the group of rare earth metals of atomic numbers 58 through 60 and 62 through 71, yttrium, and scandium, B is Nb or Ta, C is an alkaline earth metal having an atomic number in the range from 20 to 56, inclusive, i.e. calcium, strontium or barium, D is Mo or W, and O is oxygen, and $x$ is a value of from 0.002 to 0.65; and the novel processes for producing these compositions comprise the steps of (a) intimately mixing in stoichiometric amounts, an oxide of each of the metals of the generic formula; (b) firing the mixture at a temperature of 700° C.–950° C. for a period of from 10 to 14 hours; (c) subjecting the fired product to comminution and remixing; (d) compacting the remixed product; and (e) firing said compacts at a temperature of 1000–1200° C. for 10 to 14 hours.

In the drawings, the fluorescence spectrum for

Figure 4:
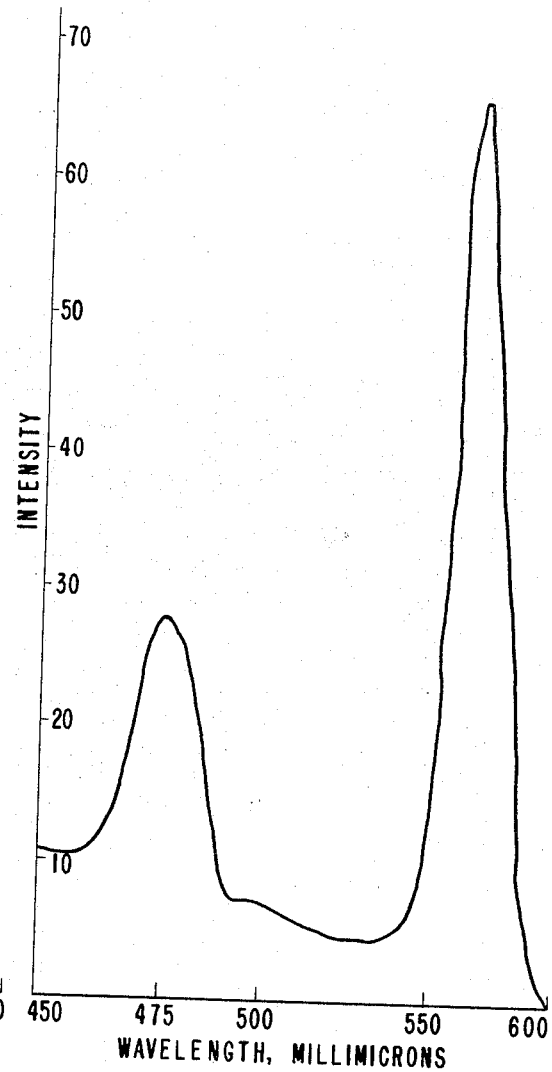
Figure 5:
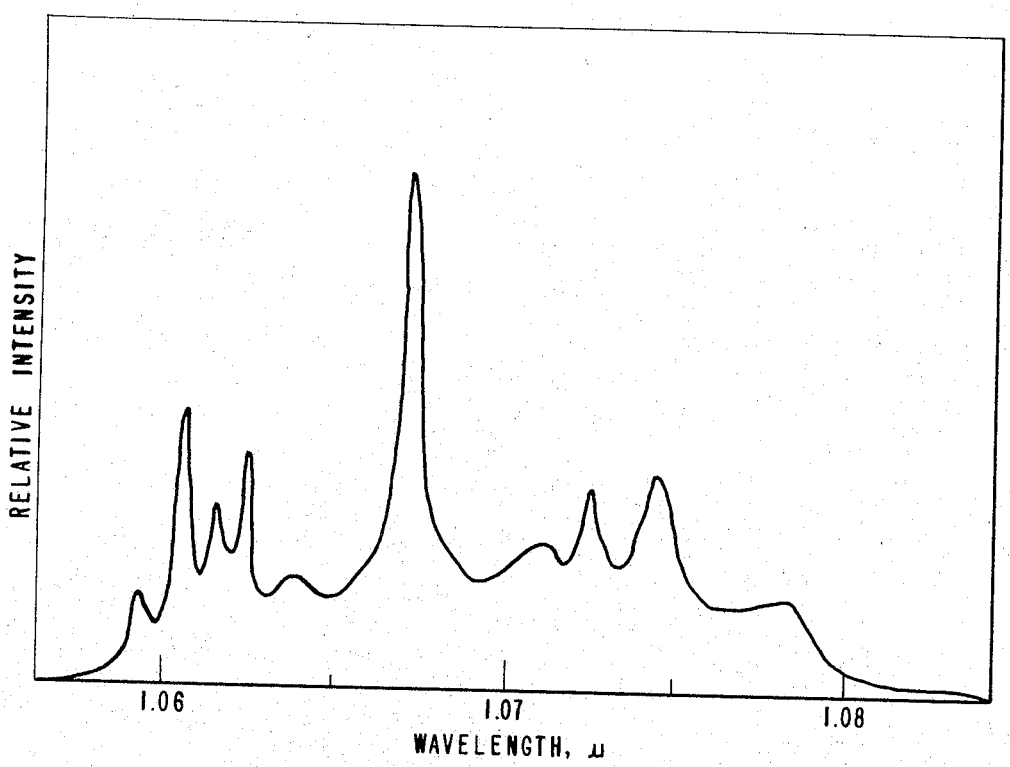

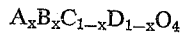

is shown in FIGURE 1, for $Tb_{.01}Nb_{.01}Sr_{.99}W_{.99}O_4$ in FIGURE 2, for $Sm_{.02}Nb_{.02}Sr_{.98}Mo_{.98}O_4$ in FIGURE 3, for $Dy_{.05}Nb_{.05}Ba_{.95}W_{.95}O_4$ in FIGURE 4, and for a single crystal of $Nd_{.01}Nb_{.01}Ca_{.99}Mo_{.99}O_4$ in FIGURE 5, each of these materials being a composition of the invention.

The new compositions are useful in a multiude of applications because of their outstanding luminescent properties. The novel compositions are particularly valuable as fluorescent phosphors for use at high temperatures in mercury vapor lamps, since the fluorescence of these novel compositions is not quenched at temperatures as high as 325° C. Among other uses are as fluorescent phosphors of different colors for lamps, cathodoluminescing compounds for color television, and, in monocrystalline form, as materials for lasers, or optical masers.

The substitution of rare earth ions in crystals of $MWO_4$ and $MMoO_4$, where M is Ca, Sr or Ba, to achieve new and useful optical properties might appear to be logical since the ionic radii of the rare earths are about the same as that of $M^{++}$ and the rare earth ion fits readily into the tungstate of molybdate lattice in place of a part of the $M^{++}$ ions. The rare earth ions may be considered, as it were, in solid solution in the $MWO_4$ or $MMoO_4$ crystal. The interaction of electromagnetic radiation with the electronic energy levels of the rare earth ions in this state may be studied and made use of; that is, one may study and make practical use of the absorption of energy by the electrons of the rare earth ion and its re-emission either by fluorescence or in the recently discovered mode of the optical maser, as discussed, for example, in "Lasers: Generation of Light by Stimulated Emission" by B. A. Lengyel (John Wiley & Sons, New York, 1962).

However, the rare earths are in general tervalent, or their most chemically stable valence is three, and Ca, Sr, and Ba are bivalent. Hence, in substituting a tervalent ion for a bivalent one in a host lattice such as $MWO_4$ or $MMoO_4$, extra electrons are added to the lattice. For electrical neutrality of the crystal as a whole, lattice vacancies are created to accommodate the extra electrons; but in general, lattice vacancies occupied by electrons alter the optical properties of the host, complicating the fluorescent emission spectra and raising the threshold energy for initiation of optical maser action (op. cit.), chemical stability is diminished, and, in practice, it is difficult to grow single crystals having such a defect structure.

To overcome the difficulties associated with lattice vacancies, other ions of appropriate radius and valence may be substituted in addition and in amount stoichiometrically equal to the amount of rare earth substituted for the alkaline earth; that is, for example, for each ion of a tervalent rare earth element introduced into the lattice, one may also introduce one univalent ion such as sodium, again into a Ca, Sr, or Ba lattice site, so that electroneutrality of the whole lattice is maintained.

In the present invention it has unexpectedly been found more advantageous to maintain electroneutrality by substituting a quinquevalent ion such as $Nb^{+5}$ or $Ta^{+5}$ into the lattice in place of sexivalent $W^{+6}$ or $Mo^{+6}$ when $M^{+2}$ ions are substituted by, for example, $Nd^{+3}$. The chemical stability of this latter type of composition is greater than that of $Na^+$ compensated crystals due to the considerable volatility of alkali metal oxides at the melting temperatures of 1500–1600° C. used for growing crystals, and further, $Na^+$ compensated crystals have some solubility in water. In general, experience with the present invention has shown that monocrystals of better optical, chemical, and even mechanical quality may be grown for optical maser applications by using the $Nb^{+5}$ or $Ta^{+5}$ compensating scheme. A further distinct advantage of this method is that the variation in concentration of rare earth ions along the length of a crystal grown by the well-known Czochralski technique is much less than what has been observed by others using $Na^{+1}$ compensation.

The foregoing considerations may serve to explain the advantages of charge compensation by introduction of a quinquevalent ion into a lattice site normally occupied by a sexivalent ion to maintain electroneutrality of the crystal when a tervalent rare earth is substituted for a bivalent alkaline earth ion such as $Ca^{++}$, $Sr^{++}$, or $Ba^{++}$, but are not to be construed as limitations on this invention except as set forth in the appended claims.

It is an object of this invention to produce luminescent compositions of matter which will be useful because of their light emitting ability. These luminescent compositions can be classed in general as band emitters or line emitters and as such find application in a variety of optical instruments. A select group of line-emitters are of particular interest for applications as solid state "laser" crystals. The term "laser" is a well-known acronym for light amplification by stimulated emission of radiation.

Within the scope of the generic formula given above, compositions wherein A, for example, equals yttrium, europium or terbium, have been made and found to have excellent properties over practically the whole region of $x$ from 0.002 to 0.65. For many other compositions of especial interest within the generic formula, $x$ has been equal to 0.5. The region of $x$ which has been found of particular interest in luminescent, and therefore laser, application is when $x$ is from 0.005 to 0.25. Compositions within this range and in which A is neodymium and B is niobium have been found to be particularly preferred.

While in the specification and claims of this application reference is made to the use of oxides of specified metals as starting materials, it will be understood that other materials, such as carbonates, which upon heating convert to the desired oxides, are the full equivalent. Similarly, when reference is made to "a" metal of a specified group, this means at least one such metal and is not to be construed as excluding additional metals of that group.

In the processes of this invention, the component oxides were weighed to the nearest 0.1 milligram according to the stoichiometry desired in the final product, and mixing was effected by ball milling in a mechanical agate ball mill under acetone. In a first firing step, the dried mixture was heated to 700° C. in the case of the molybdenum-containing compositions, and to 950° for the tungsten-containing compositions for 10 to 14 hours. These pre-reacted products were then homogenized by a second ball milling step, under acetone dried, and pressed to pellets of one inch diameter. In a second firing step, these pellets were fired at 1000–1200° C. for another 10 to 14 hours. The products were subjected to X-ray diffraction analysis, and were found to be completely reacted, homogeneous preparations free of any of the constituent oxides.

The reactants which were used in the preparation of the compounds described herein were of the best commercially available purity, usually 99.9+%. $Sc_2O_3$ was prepared by resubliming $ScCl_3$ which had been obtained by chlorination of thortveitite obtained from Norsk-Feldspat, Norway. The oxides of cerium, praseodymium, and terbium were obtained in a valence state higher than 3. Since it is a requirement of this invention that all of the elements of the rare earth group, or yttrium, or scandium be in the trivalent state, true sesquioxides were prepared by hydrogen reduction of the oxides at 1200° C. To prevent re-oxidation of the compounds thus formed, all of the subsequent reactions in which these three particular oxides were oxides were involved were carried out under ZrTi alloy-gettered argon to prevent possible reoxidation.

Compositions of matter formed according to the general procedure given above were tested for fluorescence under four conditions: At 25° C., under 3660 A. excitation and 2537 A. excitation; and at −196° C. under 3660 A. excitation, and under 2537 A. excitation. In addition to these tests, electrical properties were determined for the compositions and of these, electrical resistivities, dielectric constants, and dissipation factors are reported hereinbelow.

The following examples will illustrate in detail the preparation of the novel luminescent compositions which are the subject of this invention.

Example 1

Compositions of the general formula $$A_{0.5}Nb_{0.5}Ca_{0.5}W_{0.5}O_4$$

in which A is a trivalent rare earth element or trivalent yttrium or scandium, were prepared by heating together stoichiometric quantities of the component oxides or compounds which upon heating would form these oxides. These oxides were all of at least 99.9% purity. The requisite quantities of the component oxides were carefully weighed to the 0.1 mg., charged to an agate ball mill, and ball milled under acetone for about 60 minutes. The mixture was then removed from the ball mill and dried in air. The homogenized, dried powder mixture was then heated to 950° C. for from 10 to 14 hours. At the conclusion of this heating, the product was again homogenized by a second ball milling under acetone in the agate ball mill for 30 minutes, was again dried and then pressed into a 1″ diameter pellet under a pressure of 20,000 to 40,000 p.s.i. The pellets thus formed were subjected to a second firing step at a temperature of 1000 to 1200° C. for 10 to 14 hours. Each product which resulted was a completely reacted homogeneous preparation, whose crystal structure was determined by X-ray diffraction analysis. Structural properties, luminescent properties, and electrical properties of the 13 compositions thus prepared are given in Table 1. These compositions were prepared according to the above procedure using weights of component oxides, or oxide-forming compounds, as follows:

SERIES NO. 1

$[A_{0.5}Nb_{0.5}Ca_{0.5}W_{0.5}O_4]$

| Example | A-Oxide* | Weight in Grams | | |
|---|---|---|---|---|
| | | $Nb_2O_5$ | $CaCO_3$ | $WO_3$ |
| 1a | $Sc_2O_3$ | 1.9273 | 1.4514 | 3.3622 |
| 1b | $Y_2O_3$ | 1.1770 | 0.8864 | 2.0538 |
| 1c | $La_2O_3$ | 0.8158 | 0.6144 | 1.4235 |
| 1d | $Sm_2O_3$ | 0.7619 | 0.5738 | 1.3296 |
| 1e | $Eu_2O_3$ | 0.7552 | 0.5687 | 1.3173 |
| 1f | $Gd_2O_3$ | 0.7347 | 0.5533 | 1.2817 |
| 1g | $Tb_2O_3$ | 0.7266 | 0.5471 | 1.2675 |
| 1h | $Dy_2O_3$ | 0.7128 | 0.5368 | 1.2438 |
| 1j | $Ho_2O_3$ | 0.7034 | 0.5297 | 1.2275 |
| 1k | $Er_2O_3$ | 0.6951 | 0.5235 | 0.2130 |
| 1l | $Tm_2O_3$ | 0.6888 | 0.5188 | 1.2017 |
| 1m | $Yb_2O_3$ | 0.6745 | 0.5079 | 1.1770 |
| 1n | $Lu_2O_3$ | 0.6679 | 0.5030 | 1.1652 |

*Wt. in grams of A-Oxide=1.0000 in each case.

Structural, electrical, and luminescent properties of compositions of Series #1 are summarized in Table 1.

TABLE 1 (PART 1)

| Example | Composition | Lattice Parameters | |
|---|---|---|---|
| | | at, A | ct, A |
| 1a | $Sc_{0.5}Nb_{0.5}Ca_{0.5}W_{0.5}O_4$ | Structurally Not Identified | |
| 1b | $Y_{0.5}Nb_{0.5}Ca_{0.5}W_{0.5}O_4$ | 5.202 | 11.180 |
| 1c | $La_{0.5}Nb_{0.5}Ca_{0.5}W_{0.5}O_4$ | 5.320 | 11.455 |
| 1d | $Sm_{0.5}Nb_{0.5}Ca_{0.5}W_{0.5}O_4$ | 5.244 | 11.272 |
| 1e | $Eu_{0.5}Nb_{0.5}Ca_{0.5}W_{0.5}O_4$ | 5.234 | 11.245 |
| 1f | $Gd_{0.5}Nb_{0.5}Ca_{0.5}W_{0.5}O_4$ | 5.225 | 11.224 |
| 1g | $Tb_{0.5}Nb_{0.5}Ca_{0.5}W_{0.5}O_4$ | 5.216 | 11.200 |
| 1h | $Dy_{0.5}Nb_{0.5}Ca_{0.5}W_{0.5}O_4$ | 5.208 | 11.186 |
| 1j | $Ho_{0.5}Nb_{0.5}Ca_{0.5}W_{0.5}O_4$ | 5.196 | 11.173 |
| 1k | $Er_{0.5}Nb_{0.5}Ca_{0.5}W_{0.5}O_4$ | 5.191 | 11.161 |
| 1l | $Tm_{0.5}Nb_{0.5}Ca_{0.5}W_{0.5}O_4$ | *5.24 | *11.30 |
| 1m | $Yb_{0.5}Nb_{0.5}Ca_{0.5}W_{0.5}O_4$ | *5.24 | *11.29 |
| 1n | $Lu_{0.5}Nb_{0.5}Ca_{0.5}W_{0.5}O_4$ | *5.25 | *11.26 |

*These three samples also contained a monoclinic fraction with the following parameters:
1l—a=5.24A., b=10.87A., c=5.125A., β=93.90°.
1m—a=5.23A., b=11.05A., c=5.08A., β=93.42°.
1n—a=5.20A., b=10.90A., c=5.05A., β=93.32°.

TABLE 1 (PART 2)

| Example | Resistivity, ohm-cm. | Dielectric Constant | Dissipation Factor, Percent | Type of Emission Band [1] |
|---|---|---|---|---|
| 1a | | | | Band. |
| 1b | $5.2 \times 10^{12}$ | 9.7 | 0.9 | Do. |
| 1c | $6.7 \times 10^{11}$ | 11.2 | 1.1 | Do. |
| 1d | $9.9 \times 10^{11}$ | 7.9 | 0.8 | Line. |
| 1e | $8.3 \times 10^{10}$ | 8.5 | 0.9 | Do. |
| 1f | $7.6 \times 10^{11}$ | 8.8 | 1.1 | Band. |
| 1g | $9.9 \times 10^{11}$ | 8.3 | 0.8 | Line. |
| 1h | $3.4 \times 10^{10}$ | 8.7 | 0.9 | Do. |
| 1j | $3.9 \times 10^{12}$ | 8.1 | 0.8 | Do. |
| 1k | $4.7 \times 10^{12}$ | 7.9 | 0.7 | |
| 1l | $4.9 \times 10^{12}$ | 9.9 | 1.3 | Band. |
| 1m | $5.3 \times 10^{11}$ | 10.1 | 1.5 | Do. |
| 1n | $5.7 \times 10^{11}$ | 10.2 | 1.6 | Do. |

[1] Band stands for band-emitter, indicating a relatively broad spectrum over a wide spectral range. Line means that these materials are relatively sharp line-emitters, which makes these particular compositions candidates for laser applications, where narrow line width is a prime prerequisite.

TABLE 1 (PART 3)

| Example | Intrinsic Color | Fluorescence Color [1] | | | |
|---|---|---|---|---|---|
| | | At 25° C., 3660A., Excitation | At 25° C., 2537A., Excitation | At −196° C., 3660A., Excitation | At −196° C., 2537A., Excitation |
| 1a | Light Yellow | | S White | | S Yellow White. |
| 1b | White | | M Yellow White | | S Greenish White. |
| 1c | ----do---- | | ----do---- | | Do. |
| 1d | Light Yellow | W Orange | W Orange | W Blue | S Yellow. |
| 1e | White | | S Red | S Orange | S Red. |
| 1f | ----do---- | | S Yellow White | S Red | S Greenish White. |
| 1g | ----do---- | | M Greenish Yellow | W Orange | Do. |
| 1h | Light Yellow | M Yellow | W Bl White | W Yellow | |
| 1j | Peach | | W Green | S Peach | S Bluish White. |
| 1k | Pink | | | M Yellow | M Greenish Yellow. |
| 1l | White | W Rose | | M Lemon Yellow | M Yellow White. |
| 1m | ----do---- | | S Yellow White | M Orange | S Greenish White. |
| 1n | ----do---- | | W Blue | | M Bluish White. |
| | | | ----do---- | | Do. |

[1] The terminology for the identification of visually judged intensities is: S=Strong, M=Medium, W=Weak.

Example 2

A second series of novel luminescent compositions were prepared having the generic formula $$A_{0.5}Ta_{0.5}Ca_{0.5}W_{0.5}O_4$$

in which, as in Example 1, A was a metal of the rare earth group, or scandium, or yttrium, all in the trivalent state. Using the procedure of Example 1, compositions were prepared using amounts of the component oxides or oxide-forming compounds as given below, the amount of A-metal oxide being 1.0000 gm. in the each case.

SERIES NO. 2

| Example | A-Oxide | Weight in Grams | | |
|---|---|---|---|---|
| | | $Ta_2O_5$ | $CaCO_3$ | $WO_3$ |
| 2a | $Sc_2O_3$ | 3.2040 | 1.4514 | 3.3622 |
| 2b | $Y_2O_3$ | 1.9561 | 0.8864 | 2.0538 |
| 2c | $La_2O_3$ | 1.3558 | 0.6144 | 1.4235 |
| 2d | $Sm_2O_3$ | 1.2663 | 0.5738 | 1.3296 |
| 2e | $Eu_2O_3$ | 1.2554 | 0.5687 | 1.3174 |
| 2f | $Gd_2O_3$ | 1.2210 | 0.5533 | 1.2820 |
| 2g | $Tb_2O_3$ | 1.2078 | 0.5471 | 1.2675 |
| 2h | $Dy_2O_3$ | 1.1846 | 0.5368 | 1.2438 |
| 2j | $Ho_2O_3$ | 1.1690 | 0.5297 | 1.2275 |
| 2k | $Er_2O_3$ | 1.1552 | 0.5235 | 1.2130 |
| 2l | $Tm_2O_3$ | 1.1452 | 0.5188 | 1.2017 |
| 2m | $Yb_2O_3$ | 1.1210 | 0.5079 | 1.1770 |
| 2n | $Lu_2O_3$ | 1.1104 | 0.5029 | 1.1652 |

Luminescent and electrical properties of these compositions were determined and results are recorded in Table 2.

TABLE 2 (PART 1)

| Ex. | Composition | Emission Type | Resistivity, ohm-cm. | Dielectric Constant | Dissipation Factor, percent |
|---|---|---|---|---|---|
| 2a | $Sc_{0.5}Ta_{0.5}Ca_{0.5}W_{0.5}O_4$ | Band | $4.8 \times 10^{11}$ | 9.2 | 0.9 |
| 2b | $Y_{0.5}Ta_{0.5}Ca_{0.5}W_{0.5}O_4$ | ----do---- | $3.4 \times 10^{11}$ | 11.0 | 1.2 |
| 2c | $La_{0.5}Ta_{0.5}Ca_{0.5}W_{0.5}O_4$ | ----do---- | $4.9 \times 10^{11}$ | 11.0 | 1.2 |
| 2d | $Sm_{0.5}Ta_{0.5}Ca_{0.5}W_{0.5}O_4$ | Line | $1.4 \times 10^{12}$ | 11.3 | 1.3 |
| 2e | $Eu_{0.5}Ta_{0.5}Ca_{0.5}W_{0.5}O_4$ | ----do---- | $3.7 \times 10^{12}$ | 9.9 | 0.7 |
| 2f | $Gd_{0.5}Ta_{0.5}Ca_{0.5}W_{0.5}O_4$ | Band | $1.6 \times 10^{12}$ | 10.4 | 2.3 |
| 2g | $Tb_{0.5}Ta_{0.5}Ca_{0.5}W_{0.5}O_4$ | Line | $8.8 \times 10^{11}$ | 8.3 | 1.0 |
| 2h | $Dy_{0.5}Ta_{0.5}Ca_{0.5}W_{0.5}O_4$ | ----do---- | $1.5 \times 10^{12}$ | 12.0 | 1.5 |
| 2j | $Ho_{0.5}Ta_{0.5}Ca_{0.5}W_{0.5}O_4$ | ----do---- | $1.3 \times 10^{12}$ | 12.7 | 3.0 |
| 2k | $Er_{0.5}Ta_{0.5}Ca_{0.5}W_{0.5}O_4$ | ----do---- | $2.7 \times 10^{12}$ | 12.5 | 1.7 |
| 2l | $Tm_{0.5}Ta_{0.5}Ca_{0.5}W_{0.5}O_4$ | Band | $9.4 \times 10^{11}$ | 8.8 | 0.9 |
| 2m | $Yb_{0.5}Ta_{0.5}Ca_{0.5}W_{0.5}O_4$ | ----do---- | $3.3 \times 10^{12}$ | 9.9 | 0.7 |
| 2n | $Lu_{0.5}Ta_{0.5}Ca_{0.5}W_{0.5}O_4$ | ----do---- | | | |

TABLE 2 (PART 2)

| Example | Intrinsic Color | Fluorescence Color | | | |
|---|---|---|---|---|---|
| | | 25° C., 3660A. Excitation | 25° C., 2537A., Excitation | −196° C., 3660A., Excitation | −196° C., 2537A., Excitation |
| 2a | White | | M Bluish White | | S Bluish. |
| 2b | ----do---- | | ----do---- | M Bluish White | S Bluish White. |
| 2c | ----do---- | | ----do---- | W Red Brown | Do. |
| 2d | ----do---- | | M Pink | W Pink | M Pink. |
| 2e | ----do---- | M Red | S Red | S Red | S Red. |
| 2f | White Yellow | | S White | M Pink | S Pink. |
| 2g | Light Yellow | | S Yellow Green | W Purple | S Yellow White. |
| 2h | White | M Peach | S Peach | ----do---- | M Bluish White. |
| 2j | Light Tan | | | | Do. |
| 2k | Light Pink | | W Blue | | M Yellow White. |
| 2l | White | | ----do---- | | W Bluish White. |
| 2m | ----do---- | | W Bluish White | W Red Brown | Do. |
| 2n | ----do---- | | ----do---- | ----do---- | Do. |

Example 3

In the same manner as in Examples 1 and 2 above, a series of novel compositions of the generic formula $A_{0.5}Nb_{0.5}Ca_{0.5}Mo_{0.5}O_4$ were prepared, where A is a metal of the rare earth group, or scandium, or yttrium, each in teh trivalent state. To prepare these compositions stoichiometric amounts of the component oxides were used as follows, the amount of the A-oxide being 1.0000 gm. in each case.

SERIES NO. 3
$[A_{0.5}Nb_{0.5}Ca_{0.5}Mo_{0.5}O_4]$

| Example | A-Oxide | Weight in Grams | | |
|---|---|---|---|---|
| | | $Nb_2O_5$ | $CaCO_3$ | $MoO_3$ |
| 3a | $Sc_2O_3$ | 1.9237 | 1.4514 | 2.0874 |
| 3b | $Y_2O_3$ | 1.1770 | 0.8864 | 1.2748 |
| 3c | $La_2O_3$ | 0.8158 | 0.6144 | 0.8836 |
| 3d | $Sm_2O_3$ | 0.7619 | 0.5738 | 0.8252 |
| 3e | $Eu_2O_3$ | 0.7552 | 0.5687 | 0.8179 |
| 3f | $Gd_2O_3$ | 0.7347 | 0.5533 | 0.7957 |
| 3g | $Tb_2O_3$ | 0.7266 | 0.5471 | 0.7869 |
| 3h | $Dy_2O_3$ | 0.7128 | 0.5368 | 0.7720 |
| 3j | $Ho_2O_3$ | 0.7034 | 0.5297 | 0.7619 |
| 3k | $Er_2O_3$ | 0.6951 | 0.5235 | 0.7529 |
| 3l | $Tm_2O_3$ | 0.6889 | 0.5188 | 0.7461 |
| 3m | $Yb_2O_3$ | 0.6745 | 0.5079 | 0.7306 |
| 3n | $Lu_2O_3$ | 0.6679 | 0.5030 | 0.7234 |

Electrical and luminescent properties of compositions of Series #3 are summarized in Table 3.

Example 4

A fourth series of novel luminescent compositions were prepared having the generic formula $$A_{0.5}Ta_{0.5}Ca_{0.5}Mo_{0.5}O_4$$

where, as in the examples above, A is a metal of the rare earth group having a valence of three, or scandium or yttrium in the trivalent state. Component amounts of the constituent oxides were mixed and the compositions prepared as given in the above examples, the weight of A-oxide in each case being 1.000 gm.

SERIES NO. 4
$[A_{0.5}Ta_{0.5}Ca_{0.5}Mo_{0.5}O_4]$

| Example | A-Oxide | Weight in Grams | | |
|---|---|---|---|---|
| | | $Ta_2O_5$ | $CO_3Ca$ | $MoO_3$ |
| 4a | $Sc_2O_3$ | 3.2040 | 1.4514 | 2.0874 |
| 4b | $Y_2O_3$ | 1.9561 | 0.8864 | 1.2748 |
| 4c | $La_2O_3$ | 1.3558 | 0.6144 | 0.8836 |
| 4d | $Sm_2O_3$ | 1.2663 | 0.5738 | 0.8252 |
| 4e | $Eu_2O_3$ | 1.2554 | 0.5687 | 0.8179 |
| 4f | $Gd_2O_3$ | 1.2210 | 0.5533 | 0.7957 |
| 4h | $Tb_2O_3$ | 1.2078 | 0.5471 | 0.7869 |
| 4h | $Dy_2O_3$ | 1.1846 | 0.5368 | 0.7720 |
| 4j | $Ho_2O_3$ | 1.1690 | 0.5297 | 0.7619 |
| 4k | $Er_2O_3$ | 1.1552 | 0.5235 | 0.7529 |
| 4l | $Tm_2O_3$ | 1.1452 | 0.5188 | 0.7461 |
| 4m | $Yb_2O_3$ | 1.1210 | 0.5079 | 0.7306 |
| 4n | $Lu_2O_3$ | 1.1103 | 0.5030 | 0.7234 |

Electrical and luminescent properties of compositions of Series #4 are summarized in Table 4.

TABLE 3 (PART 1)

| Ex. | Composition | Emission Type | Resistivity, ohm-cm. | Dielectric Constant | Dissipation Factor, Percent |
|---|---|---|---|---|---|
| 3a | $Sc_{0.5}Nb_{0.5}Ca_{0.5}Mo_{0.5}O_4$ | Band | $5.2 \times 10^{12}$ | 7.2 | 0.9 |
| 3b | $Y_{0.5}Nb_{0.5}Ca_{0.5}Mo_{0.5}O_4$ | do | $3.7 \times 10^{11}$ | 7.7 | 0.8 |
| 3c | $La_{0.5}Nb_{0.5}Ca_{0.5}Mo_{0.5}O_4$ | do | $4.8 \times 10^{12}$ | 8.5 | 0.8 |
| 3d | $Sm_{0.5}Nb_{0.5}Ca_{0.5}Mo_{0.5}O_4$ | Line | $1.2 \times 10^{12}$ | 7.4 | 0.9 |
| 3e | $Eu_{0.5}Nb_{0.5}Ca_{0.5}Mo_{0.5}O_4$ | do | $2.3 \times 10^{12}$ | 7.8 | 1.1 |
| 3f | $Gd_{0.5}Nb_{0.5}Ca_{0.5}Mo_{0.5}O_4$ | Band | $4.4 \times 10^{11}$ | 7.9 | 1.2 |
| 3g | $Tb_{0.5}Nb_{0.5}Ca_{0.5}Mo_{0.5}O_4$ | Line | $3.9 \times 10^{12}$ | 9.9 | 3.2 |
| 3h | $Dy_{0.5}Nb_{0.5}Ca_{0.5}Mo_{0.5}O_4$ | do | $9.7 \times 10^{11}$ | 7.7 | 1.2 |
| 3j | $Ho_{0.5}Nb_{0.5}Ca_{0.5}Mo_{0.5}O_4$ | do | $3.4 \times 10^{11}$ | 9.0 | 2.4 |
| 3k | $Er_{0.5}Nb_{0.5}Ca_{0.5}Mo_{0.5}O_4$ | do | $8.8 \times 10^{11}$ | 7.1 | 2.1 |
| 3l | $Tm_{0.5}Nb_{0.5}Ca_{0.5}Mo_{0.5}O_4$ | Band | $2.3 \times 10^{12}$ | 8.3 | 1.4 |
| 3m | $Yb_{0.5}Nb_{0.5}Ca_{0.5}Mo_{0.5}O_4$ | do | $1.0 \times 10^{12}$ | 8.0 | 1.5 |
| 3n | $Lu_{0.5}Nb_{0.5}Ca_{0.5}Mo_{0.5}O_4$ | do | $1.1 \times 10^{12}$ | 7.2 | 0.9 |

TABLE 3 (PART 2)

| Example | Intrinsic Color | Fluorescence Color | | | |
|---|---|---|---|---|---|
| | | 25° C., 3660A., Excitation | 25° C., 2537A., Excitation | −196° C., 3660A., Excitation | −196° C., 2537A., Excitation |
| 3a | Light Yellow | | S Cream Yellow | | S Yellow. |
| 3b | White | | W Pink | S Orange Yellow | S Light Yellow. |
| 3c | do | | do | M Orange | S Orange Yellow. |
| 3d | Light Tan | W Orange | W Orange | S Orange | S Yellow. |
| 3e | White | | S Red | S Red | S Red. |
| 3f | do | | W Peach | S Orange | S Orange Yellow. |
| 3g | Light Tan | | M Yellow | | S Greensih Yellow |
| 3h | White | | W Pink | W Pink | M Pink White. |
| 3j | Tan | | do | W White | Do. |
| 3k | Pink | | do | M Yellow White | Do. |
| 3l | White | | do | | Do. |
| 3m | do | | M Peach | | S Yellow. |
| 3n | do | | do | S Orange | Do. |

TABLE 4 (PART 1)

| Ex. | Composition | Emission Type | Resistivity, ohm-cm. | Dielectric Constant | Dissipation Factor, Percent |
|---|---|---|---|---|---|
| 4a | $Sc_{0.5}Ta_{0.5}Mo_{0.5}Ca_{0.5}O_4$ | Band | $3.4 \times 10^{11}$ | 8.2 | 0.9 |
| 4b | $Y_{0.5}Ta_{0.5}Mo_{0.5}Ca_{0.5}O_4$ | do | $4.2 \times 10^{12}$ | 7.9 | 0.8 |
| 4c | $La_{0.5}Ta_{0.5}Mo_{0.5}Ca_{0.5}O_4$ | do | $2.3 \times 10^{12}$ | 9.4 | 1.5 |
| 4d | $Sm_{0.5}Ta_{0.5}Mo_{0.5}Ca_{0.5}O_4$ | Line | $4.2 \times 10^{12}$ | 7.5 | 1.0 |
| 4e | $Eu_{0.5}Ta_{0.5}Mo_{0.5}Ca_{0.5}O_4$ | do | $3.7 \times 10^{11}$ | 7.3 | 0.9 |
| 4f | $Gd_{0.5}Ta_{0.5}Mo_{0.5}Ca_{0.5}O_4$ | Band | $8.8 \times 10^{11}$ | 8.2 | 0.8 |
| 4g | $Tb_{0.5}Ta_{0.5}Mo_{0.5}Ca_{0.5}O_4$ | Line | $4.1 \times 10^{12}$ | 9.3 | 3.1 |
| 4h | $Dy_{0.5}Ta_{0.5}Mo_{0.5}Ca_{0.5}O_4$ | do | $5.3 \times 10^{11}$ | 8.7 | 1.2 |
| 4j | $Ho_{0.5}Ta_{0.5}Mo_{0.5}Ca_{0.5}O_4$ | do | $6.7 \times 10^{11}$ | 7.5 | 1.3 |
| 4k | $Er_{0.5}Ta_{0.5}Mo_{0.5}Ca_{0.5}O_4$ | do | $1.3 \times 10^{12}$ | 7.2 | 1.4 |
| 4l | $Tm_{0.5}Ta_{0.5}Mo_{0.5}Ca_{0.5}O_4$ | Band | $8.4 \times 10^{11}$ | 7.9 | 0.9 |
| 4m | $Yb_{0.5}Ta_{0.5}Mo_{0.5}Ca_{0.5}O_4$ | do | $7.7 \times 10^{11}$ | 8.2 | 0.8 |
| 4n | $Lu_{0.5}Ta_{0.5}Mo_{0.5}Ca_{0.5}O_4$ | do | $6.4 \times 10^{11}$ | 8.5 | 1.2 |

TABLE 4 (PART 2)

| Example | Intrinsic Color | Fluorescence Color | | | |
|---|---|---|---|---|---|
| | | 25° C., 3660A., Excitation | 25° C., 2537A., Excitation | −196° C., 3660A., Excitation | −196° C., 2537A., Excitation |
| 4a | Light Tan | | S Cream Yellow | | S Yellow. |
| 4b | White | | M Peach | S Orange | S Lemon Yellow. |
| 4c | do | | W Peach | M Orange | S Yellow Orange. |
| 4d | Light Yellow | | W Red | | W Pink. |
| 4e | White | M Red | S Red | S Red | S Red. |
| 4f | do | do | M Pink | | S Yellow. |
| 4g | Yellow | | S Greenish Yellow | M Orange Yellow | S Greenish Yellow. |
| 4h | White | | M Pink | | S Pink Yellow. |
| 4j | Light Tan | | do | | S Pink White. |
| 4k | Light Pink | | M Yellow Pink | W Pink | Do. |
| 4l | White | | M Pink | | Do. |
| 4m | do | | S Cream Yellow | | S Yellow. |
| 4n | do | | do | M Red | Do. |

Example 5

Referring to the information which is given in Tables 1 to 4 above, it will be noted that several of the compositions which are reported showed line emission spectra. These compositions are therefore of particular interest for laser applications. The line emission characteristics are shown in the following study of the particular system $Eu_xNb_xCa_{1-x}W_{1-x}O_4$ over a wide range of values for $x$, these being within the range given above, from 0.002 to 0.65.

Using the procedure described in Examples 1 through 4, the following weights (stoichiometric quantities) of oxides were used to prepare compositions of the formulas which are given.

TABLE 5

| Ex. | Composition | x | Weight of Oxide in Grams | | | |
|---|---|---|---|---|---|---|
| | | | $Eu_2O_3$ | $Nb_2O_5$ | $CaCO_3$ | $WO_3$ |
| 5a | $Eu_{0.05}Nb_{0.05}Ca_{0.95}W_{0.95}O_4$ | 0.05 | 1.0000 | 0.7552 | 10.8052 | 25.0303 |
| 5b | $Eu_{0.1}Nb_{0.1}Ca_{0.9}W_{0.9}O_4$ | 0.1 | 1.0000 | 0.7552 | 5.1182 | 11.8565 |
| 5c | $Eu_{0.2}Nb_{0.2}Ca_{0.8}W_{0.8}O_4$ | 0.2 | 1.0000 | 0.7552 | 2.2748 | 5.2695 |
| 5d | $Eu_{0.25}Nb_{0.25}Ca_{0.75}W_{0.75}O_4$ | 0.25 | 1.0000 | 0.7552 | 1.7061 | 3.9521 |
| 5e | $Eu_{0.55}Nb_{0.55}Ca_{0.45}W_{0.45}O_4$ | 0.55 | 2.0000 | 1.5104 | 0.9306 | 2.1558 |
| 5f | $Eu_{0.6}Nb_{0.6}Ca_{0.4}W_{0.4}O_4$ | 0.6 | 2.0000 | 1.5104 | 0.7582 | 1.7566 |
| 5g | $Eu_{0.65}Nb_{0.65}Ca_{0.35}W_{0.35}O_4$ | 0.65 | 2.0000 | 1.5104 | 0.6124 | 1.5188 |

The purposes in preparing this system of compositions was two-fold: (a) to determine the composition of the material at which the transition from scheelite to fergusonite structure occurs; and (b) to establish the $x$-value for optimum of fluorescent emission. The scheelite-to-fergusonite transition occurs at an $x$-value of 0.6 to 0.65. The optimum fluorescence emission occurs between $x=0.1$ and $x=0.2$. The fluorescence spectrum for the composition of $Eu_{0.5}Ca_{0.5}W_{0.5}Nb_{0.5}O_4$ is given in FIGURE 1. The spectrographic data on Examples 5a, 5b, 5c, 5d shows clearly that these rare earth compounds are sharp line emitters, and that in the case where the rare earth metal used was europium, the compositions where $x=0.1$ to 0.2 are the most intense in fluorescence.

FIGURE 1 demonstrates the line emitting diameter of the europium compound named above, and shows that the most intense line is around 6100 A. with a line half width of approximately 10 A., an exceptionally good result. (By "half-width" is meant the line width at half the intensity peak.)

Because many of the compositions prepared were shown to be "line emitter" materials, they are recognized as important potential laser materials. To use these line emitter materials as lasers, it is, of course, necessary to obtain them in the form of single crystals. To show that the necessary crystals can be formed from the materials of this invention, a single crystal of approximately ½" x 3" was prepared of the material of composition

$Tb_{0.04}Nb_{0.04}Ca_{0.96}W_{0.96}O_4$

This composition was prepared using stoichiometric amounts of the oxides as described in the examples above. The constituent oxides ($CaWO_4$ and $TbNbO_4$) were charged into a rhodium crucible, and the single crystal was pulled by the procedure of the well-known Czochralski technique as described by J. Czochralski in Zeit. Phys. Chem., 92, 219–221 (1917).

Example 6

In the same manner as is described in Example 1, above, additional solid-solution compositions were prepared and luminescent properties were studied. Compositions which were found to be strong line-emitters and therefore preferred compositions were prepared by following the procedure of Example 1 using weights of the constituent oxides (for oxide-forming components) as follows:

TABLE 6

| Ex. | Composition | Weights of Component Materials Used in Grams ||||||
|---|---|---|---|---|---|---|---|
| | | *$A_2O_3$ | $Nb_2O_5$ | $Ta_2O_5$ | $CaCO_3$ | $WO_3$ | $MoO_3$ |
| 6a | $Sm_{.05}Nb_{.05}Ca_{0.95}W_{0.95}O_4$ | 0.1834 | 0.1398 | | 2.0000 | 4.6330 | |
| 6b | $Sm_{.05}Ta_{.05}Ca_{0.95}W_{0.95}O_4$ | 0.1834 | | 0.2324 | 2.0000 | 4.6330 | |
| 6c | $Tb_{.05}Nb_{.05}Ca_{0.95}W_{0.95}O_4$ | 0.1924 | 0.1398 | | 2.0000 | 4.6330 | |
| 6d | $Tb_{.05}Ta_{.05}Ca_{0.95}W_{0.95}O_4$ | 0.1924 | | 0.2324 | 2.0000 | 4.6330 | |
| 6e | $Dy_{.05}Nb_{.05}Ca_{0.95}W_{0.95}O_4$ | 0.1962 | 0.1398 | | 2.0000 | 4.6330 | |
| 6f | $Dy_{.05}Ta_{.05}Ca_{0.95}W_{0.95}O_4$ | 0.1962 | | 0.2324 | 2.0000 | 4.6330 | |
| 6g | $Sm_{.01}Nb_{.01}Ca_{0.99}Mo_{0.99}O_4$ | 0.0352 | 0.0268 | | 2.0000 | | 2.8764 |
| 6h | $Sm_{.01}Ta_{.01}Ca_{0.99}Mo_{0.99}O_4$ | 0.0352 | | 0.0446 | 2.000 | | 2.8764 |
| 6j | $Tb_{.01}Nb_{.01}Ca_{0.99}Mo_{0.99}O_4$ | 0.0370 | 0.0268 | | 2.0000 | | 2.8764 |
| 6k | $Tb_{.01}Ta_{.01}Ca_{0.99}Mo_{0.99}O_4$ | 0.0370 | | 0.0446 | 2.0000 | | 2.8764 |
| 6l | $Dy_{.01}Nb_{.01}Ca_{0.99}Mo_{0.99}O_4$ | 0.0376 | 0.0268 | | 2.0000 | | 2.8764 |
| 6m | $Dy_{.01}Ta_{.01}Ca_{0.99}Mo_{0.99}O_4$ | 0.0376 | | 0.0446 | 2.0000 | | 2.8764 |

*A = Rare earth metal.

The outstanding luminescent properties of these compositions are shown by the following optical data:

TABLE 7

| Ex. | Composition | Most Intense Line-Emission at A. | Color of Fluorescent Emission |
|---|---|---|---|
| 6a | $Sm_{.05}Nb_{.05}Ca_{0.95}W_{0.95}O_4$ | 5,700 | Orange. |
| 6b | $Sm_{.05}Ta_{.05}Ca_{0.95}W_{0.95}O_4$ | 5,700 | Do. |
| 6c | $Tb_{.05}Nb_{.05}Ca_{0.95}W_{0.95}O_4$ | 5,420 | Green. |
| 6d | $Tb_{.05}Ta_{.05}Ca_{0.95}W_{0.95}O_4$ | 5,420 | Do. |
| 6e | $Dy_{.05}Nb_{.05}Ca_{0.95}W_{0.95}O_4$ | 5,720 | Yellow. |
| 6f | $Dy_{.05}Ta_{.05}Ca_{0.95}Mo_{0.95}O_4$ | 5,720 | Do. |
| 6g | $Sm_{.01}Nb_{.01}Ca_{0.99}Mo_{0.99}O_4$ | 5,700 | Orange. |
| 6h | $Sm_{.01}Ta_{.01}Ca_{0.99}Mo_{0.99}O_4$ | 5,700 | Do. |
| 6j | $Tb_{.01}Nb_{.01}Ca_{0.99}Mo_{0.99}O_4$ | 5,420 | Green. |
| 6k | $Tb_{.01}Ta_{.01}Ca_{0.99}Mo_{0.99}O_4$ | 5,420 | Do. |
| 6l | $Dy_{.01}Nb_{.01}Ca_{0.99}Mo_{0.99}O_4$ | 5,720 | Yellow. |
| 6m | $Dy_{.01}Ta_{.01}Ca_{0.99}Mo_{0.99}O_4$ | 5,720 | Do. |

Compositions 6b and 6l as given in the above table were tested for fluorescence at elevated temperatures. It was found that there was no decrease in the intensity of the fluorescent emission at temperatures at least as high as 325° C.

Example 7

Compositions in which the alkaline earth metal, strontium, was substituted for the calcium of Examples 1 to 6 were made by the procedure of Example 1, using strontium carbonate in place of the calcium carbonate. Products which were strong line-emitters, and therefore preferred compositions, were obtained using weights of constituent oxides or oxide-forming components as follows:

TABLE 8

| Ex. | Composition | Weights of Component Materials Used in Grams ||||||
|---|---|---|---|---|---|---|---|
| | | *$A_2O_3$ | $Nb_2O_5$ | $Ta_2O_5$ | $SrCO_3$ | $WO_3$ | $MoO_3$ |
| 7a | $Tb_{.01}Nb_{.01}Sr_{.99}W_{.99}O_4$ | 0.0250 | 0.0182 | | 2.0000 | 3.1400 | |
| 7b | $Tb_{.02}Ta_{.02}Sr_{.98}W_{.98}O_4$ | 0.0506 | | 0.0611 | 2.0000 | 3.1400 | |
| 7c | $Sm_{.02}Nb_{.02}Sr_{.98}Mo_{.98}O_4$ | 0.0482 | 0.0367 | | 2.0000 | | 1.9500 |
| 7d | $Nd_{.01}Ta_{.01}Sr_{.99}W_{.99}O_4$ | 1.0000 | | 1.3126 | 86.8625 | 136.4478 | |
| 7e | $Nd_{.01}Nb_{.01}Sr_{.99}W_{.99}O_4$ | 1.0000 | 0.7898 | | 86.8625 | 136.4478 | |

*A = Rare earth metal.

In like manner, products which were strong line-emitters were prepared using barium carbonate in place of the calcium carbonate or strontium carbonate of the prior examples. The compositions, and the proportion of components used to make them, are shown in Table 9.

TABLE 9

| Example | Composition | Weights of Component Materials Used in Grams ||||||
|---|---|---|---|---|---|---|---|
| | | *$A_2O_3$ | $Nb_2O_5$ | $Ta_2O_5$ | $BaCO_3$ | $WO_3$ | $MoO_3$ |
| 7f | $Dy_{.05}Nb_{.05}Ba_{.95}W_{.95}O_4$ | .0995 | .0709 | | 2.0000 | 2.3494 | |
| 7g | $Sm_{.01}Ta_{.01}Ba_{.99}W_{.99}O_4$ | .0178 | | .0226 | 2.0000 | 2.3494 | |
| 7h | $Dy_{.05}Nb_{.05}Ba_{.95}Mo_{.95}O_4$ | .0995 | .0709 | | 2.0000 | | 1.4586 |
| 7i | $Nd_{.01}Nb_{.01}Ba_{.99}Mo_{.99}O_4$ | 1.0000 | .7898 | | 116.1207 | | 84.6916 |
| 7j | $Nd_{.01}Nb_{.01}Ba_{.99}W_{.99}O_4$ | 1.0000 | .7898 | | 116.1207 | 136.4478 | |
| 7k | $Nd_{.01}Ta_{.01}Ba_{.99}W_{.99}O_4$ | 1.0000 | | 1.3126 | 116.1207 | 136.4478 | |

Additional compositions having the same generic formula as 7b, 7c, 7j, 7g and 7h, above, were prepared, the values for the substitutional amounts of the rare earth element and of niobium or tantalum being varied from 0.002 to 0.1. These series of compositions were tested to establish the level at which optimum fluorescence was obtained. In each series it was found that the compositions of Examples 7b, 7c, 7f, 7g and 7h exhibited the maximum fluorescence.

FIGURE 2 of the drawings shows the fluorescent emission spectrum for the composition of Example 7a. The composition of Example 7b gave an almost identical emission spectrum. FIGURE 3 shows the fluorescent emission spectrum for the composition of Example 7c; the spectrum for 7g was almost identical. FIGURE 4 shows the spectrum for the composition of Example 7f; the spectrum for 7h was almost identical.

*Examples 8 and 9*

To illustrate the properties of the single crystals formed by the compositions of this invention, compositions of the formulas $Nd_{0.01}Nb_{0.01}Ca_{0.99}Mo_{0.99}O_4$ (Example 8) and $Nd_{0.01}Nb_{0.01}Sr_{0.99}Mo_{0.99}O_4$ (Example 9) were prepared by charging stoichiometric quantities of $Nd_2O_3$, $Nb_2O_5$, and $CaMoO_4$ (for the first composition), or $SrMoO_4$ (for the second composition) into an iridium crucible, melting, and pulling crystals approximately ½" x 3". For each of these, the strontium- or calcium molybdate used was prepared in very pure form according to the following procedure:

Solutions of ammonium molybdate and calcium- or strontium nitrate (all solutions treated with ammonium and filtered for repurification) were reacted to precipitate calcium or strontium molybdate ($CaMoO_4$ or $SrMoO_4$) of high purity. The precipitate in each case was filtered, washed and dried at 900° C.

For the preparation of the single crystal of Example 8, 100.00 g. $CaMoO_4$, 0.8455 g. $Nd_2O_3$, and 0.6672 g. $Nb_2O_5$ were mixed and melted.

For the preparation of the single crystal of Example 9, 125.00 g. of $SrMoO_4$, 0.8997 g. $Nd_2O_3$, and 0.7103 g. $Nb_2O_5$ were mixed and melted.

For the single crystals of Example 8, the laser qualities were tested and the data are given in Table 10.

The fluoroescent emission spectrum for the composition of Example 8 is shown in FIG. 5. The spectrum for composition of Example 9 was essentially identical to this.

To determine at what value of $x$ in the formula $Nd_xNb_xSr_{1-x}Mo_{1-x}O_4$, the maximum intensity of fluorescence is obtained, a series of compositions were prepared including the composition of Example 9. It was found that for this combination of elements, maximum fluorescence was obtained when $x$ had a value of 0.013.

TABLE 10.—LASER DATA

Typical Composition—$(NdNb)_{0.01}(CaMo)_{.99}O_4$
$NdNbO_4$ Segregation Coefficient in $CaMoO_4$—1.3
Lattice Parameters—$a_t=5.213$A., $c_t=11.395$A.
Expansion Coefficient—In $a$ dir.$=19.43 \times 10^{-6}$, in $c$ dir.$=25.48 \times 10^{-6}$
Thermal Conductivity—In a dir.$=29.5$ m watts/cm.-deg. (295° K.)
Refractive Index—1.98
Dielectric Const.—In $a$ dir.$=12.5$ (at 1 kc./sec.)
Melting Point—1480° C.
Typical Threshold—1.6–10 joules (195° K.)
Lifetime—120–180 μsec (295° K.) (150 μsec at optimum)
Line Width—5A. (77° K.)

I claim:
1. A single-phase, solid-solution, luminescent composition of the formula $Nd_xNb_xCa_{1-x}Mo_{1-x}O_4$, where $x$ has a value between 0.002 and 0.65.
2. A solid-solution, luminescent composition of the formula $Nd_{.013}Nb_{.013}Co_{.987}Mo_{.987}O_4$, characterized in that, on illumination by electro-magnetic radiation in the ultra-violet region of the spectrum, luminescence occurs by emission of light of a wavelength different from that of the ultra-violet light-emitting source, said luminescence occurring over a very narrow range of spectral wavelength.
3. A single crystal of a single-phase, solid solution luminescent composition of the formula

$$Nd_xNb_xCa_{1-x}Mo_{1-x}O_4$$

where $x$ has a value between 0.002 and 0.6.
4. A laser having as the light-emitting and light-amplifying component thereof a single-crystal composition of claim 3.
5. In a method for amplification of light by stimulated emission of radiation the step comprising stimulating by electromagnetic radiation in the ultraviolet region of the spectrum a single crystal composition of claim 4, whereby light is emitted therefrom having wavelengths in a narrow spectral range.

References Cited

UNITED STATES PATENTS

| | | | |
|---|---|---|---|
| 3,225,306 | 12/1965 | Johnson et al. | 252—301.5 |
| 3,257,625 | 6/1966 | Johnson et al. | 11—301.4 |
| 3,265,628 | 8/1966 | Vogel | 252—301.5 |

OTHER REFERENCES

Kroger, Some Aspects of the Luminescence of Solids, Elsevier Publishing Co., N.Y., 1948, pgs. 108–112, and 290–298.

Kiss et al., Optical Maser Action in $CaWO_4$:Er, Proc. IRE, vol. 50, No. 6, June 1962, page 1531.

Nassau, Crystals for Optical Masers, Bell Lab. Record, March 1963, pgs. 95–99.

TOBIAS E. LEVOW, *Primary Examiner.*

HELEN M. McCARTHY, *Examiner.*

R. D. EDMONDS, *Assistant Examiner.*

UNITED STATES PATENT OFFICE
CERTIFICATE OF CORRECTION

Patent No. 3,338,841                          August 29, 1967

Lothar H. Brixner

It is hereby certified that error appears in the above numbered patent requiring correction and that the said Letters Patent should read as corrected below.

Column 14, line 18, for "$Nd_{.013}Nb_{.013}Co_{.987}Mo_{.987}O_4$"

read -- $Nd_{.013}Nb_{.013}Ca_{.987}Mo_{.987}O_4$ --.

Signed and sealed this 3rd day of September 1968.

(SEAL)
Attest:

Edward M. Fletcher, Jr.                        EDWARD J. BRENNER
Attesting Officer                              Commissioner of Patents